US00RE34320E

United States Patent [19]

Keppler

[11] E Patent Number: Re. 34,320

[45] Reissued Date of Patent: Jul. 20, 1993

[54] EXERCISING APPARATUS FOR SKATERS

[76] Inventor: Louis Keppler, 17529 Fairfax La., Strongsville, Ohio 44136

[21] Appl. No.: 598,060

[22] Filed: Oct. 15, 1990

Related U.S. Patent Documents

Reissue of:

[64] Patent No.: 4,779,862
Issued: Oct. 25, 1988
Appl. No.: 67,946
Filed: Jun. 29, 1987

[51] Int. Cl.[5] ..... A63B 23/04

[52] U.S. Cl. ..... 482/51; 472/85; 472/90

[58] Field of Search ..... 272/56.5 SS, 56.5 R, 272/70, 93, 97, 3, 1; 273/1 B, 1 R, 8, 30, 51, 3 R, 285, 286, 287; 482/51, 70, 71, 148; 472/85, 90

[56] References Cited

U.S. PATENT DOCUMENTS

| | | | |
|---|---|---|---|
| 821,881 | 5/1906 | Pell et al. | 273/286 |
| 1,641,525 | 9/1927 | Boessow | 273/285 |
| 2,842,365 | 7/1958 | Kelley | 272/70 X |
| 3,468,536 | 9/1969 | Minshull et al. | 272/30 |
| 3,497,211 | 2/1970 | Nagin | 272/3 |
| 3,508,945 | 4/1970 | Haemer et al. | 272/70 |
| 3,524,641 | 8/1970 | Ossenkop | 272/97 |
| 4,169,688 | 10/1979 | Toshio | 272/3 |
| 4,340,214 | 7/1982 | Schutzer | 272/70 |

FOREIGN PATENT DOCUMENTS

| | | | |
|---|---|---|---|
| 2041227 | 9/1980 | United Kingdom | 272/56.5 R |

*Primary Examiner*—Robert Bahr
*Attorney, Agent, or Firm*—Tarolli, Sundheim & Covell

[57] ABSTRACT

An exercising apparatus for a speed skater or similar athlete including a base having a plurality of board members arranged in side-by-side relationship. Hinges pivotally connect adjacent board members to each other. A flexible plastic sheet overlays the board members and has a smooth glide surface on which the skater can slide. Bumpers are located at opposite ends of the base. Clamps releasably interconnect the base, the sheet, and the bumpers.

13 Claims, 3 Drawing Sheets

EXERCISING APPARATUS FOR SKATERS

Matter enclosed in heavy brackets [ ] appears in the original patent but forms no part of this reissue specification; matter printed in italics indicates the additions made by reissue.

BACKGROUND AND SUMMARY OF THE INVENTION

This invention relates to an exercising apparatus for a skater or similar athlete and, especially, to an exercising apparatus that is simple in construction and easy to transport and store.

The leg muscles of a speed skater or similar athlete have to be properly exercised to increase the strength and improve the technique of the skater. What requires the most practice is a power stroke in which the foot extends transverse to the direction of leg movement. When using this stroke, a skater moves forward and sidewise in first one direction and then in the opposite direction by pushing off of the edges of the skates. This type of movement is required in other sports, for example, skiing.

There are known exercising devices for practicing the foregoing movement. One of such devices is shown in U.S. Pat. No. 4,340,214. The device of U.S. Pat. No. 4,340,214 comprises a platform consisting of two horizontal rail units extending transverse to the skating direction. Two separate carriages are movable in opposite directions along the rail units. Straps are provided to secure a person's feet to the carriages. The device of U.S. Pat. No. 4,340,214 is rather complex. It occupies substantial space and is difficult to transport.

Accordingly, an object of the present invention is to provide a skater's exercising apparatus which is inexpensive to construct and easy to transport and store. These and other objects of the present invention are achieved by providing an exercising apparatus having a base which is covered by a sheet. The flexible sheet is preferably made of plastic material and has a smooth upper surface on which the feet of a person can slide. Bumpers are attached to the base to prevent the feet of a person exercising with the apparatus from sliding off the sheet. The sheet and the bumpers are attached to opposite ends of the base by clamps. The clamps are movable to adjust the distance between the bumpers to correspond to a desired exercise stroke.

To enable the exercise apparatus to be compacted and stored or transported, the base is formed of a plurality of boards that are connected to each other by connectors. In a preferred embodiment, the boards are pivotally connected to each other by hinge connectors. By putting on socks, a person can slide from bumper to bumper. When not in use, the base is folded and the sheet is rolled up. The construction of the exercising apparatus is simple and, when not in use, occupies little space.

BRIEF DESCRIPTION OF THE DRAWINGS

Various objects and advantages of the present invention will become more fully apparent from the following description with reference to the accompanying drawings wherein.

DESCRIPTION OF THE PREFERRED EMBODIMENT

Figure 2:
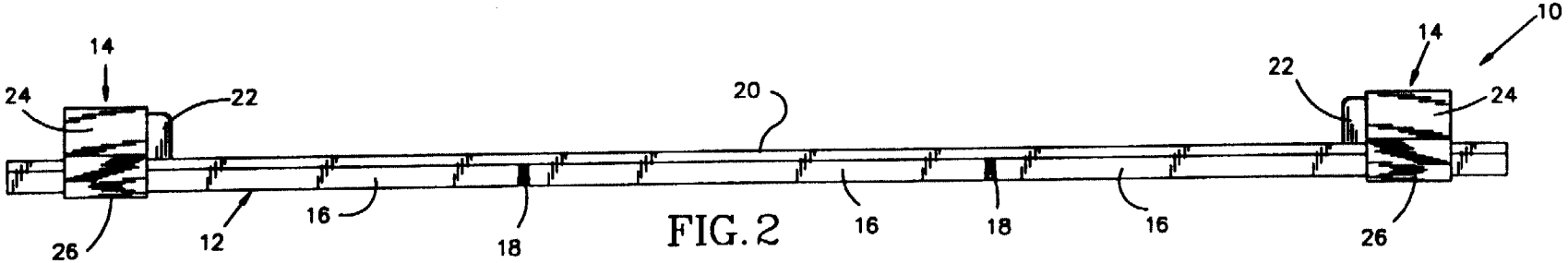
FIG. 2 is an elevational view of the exercising apparatus of FIG. 1.

The exercising apparatus 10 comprises a base 12 and two bumpers 14 attached to opposite end portions of the base. The base 12 includes of a plurality of boards 16 which are connected to each other by hinges 18 (FIG. 2). The upper side of the rectangular base 12 is covered by a flexible glide sheet 20.

The glide sheet 20 is made from plastic. The rigid boards 16 are preferably made of wood or other material, such as hard plastic. The rectangular base 12 has a distance between bumpers 14 of approximately 8 feet. The base 12 has a width of approximately 2 feet.

The rectangular sheet 20 has a length and width which is approximately the same as the length and width of the base 12. The sheet 20 has a thickness of approximately ⅛ inch. FIG. 2 shows that the exercising apparatus consists of three boards 16. However, the number of boards 16 may vary dependent on the desired distance between bumpers 14 and the width of the boards.

The bumper 14 generally comprises a cushion part 22 (FIGS. 3 and 4) and a support part 24. The part 24 may be wood, metal or hard plastic. The cushion part 22 is preferably molded with the support part 24. Clearly, other means such, i.e., as glue, may be used to connect the cushion part 22 with the support part 24.

Figure 4:
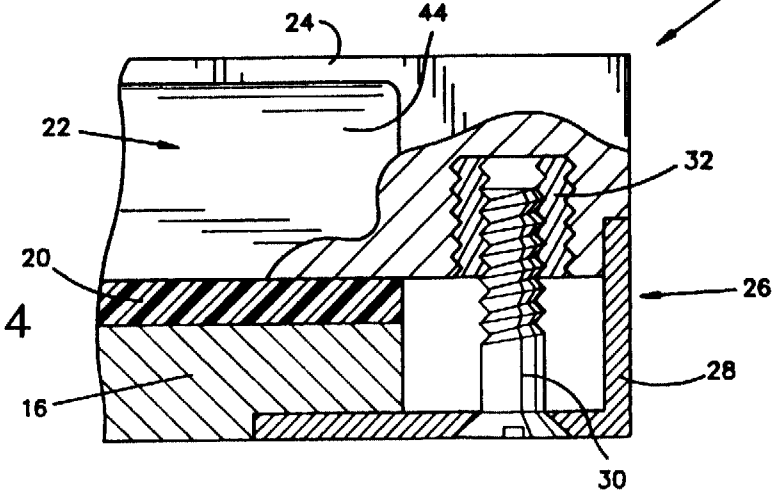
FIG. 4 is a fragmentary sectional view, taken generally along the line 4—4 of FIG. 3, further illustrating the manner in which the bumper, base and glide sheet are interconnected.

The bumpers 14, glide sheet 20 and boards 16 are interconnected by clamp assemblies 26. Each of the releasable clamp assemblies 26 includes a metal bracket 28, a bolt 30 and a nut 32 (FIG. 4). Each of the nuts 32 is mounted in a support part 24 of a bumper. In the illustrated embodiment of the invention, two bolts 30 and nuts 32 are used to secure each of the clamp members 26 with the end portion of a bumper support part 24. However, any desired number of bolts could be used.

The bolts 30 are tightened into the nuts 32 to apply force to the bracket 28 (FIG. 4) and bumper support part 24 to compress the glide sheet 20 between the bumper support part and a board 16 engaged by the bracket 28. The clamping force applied to the board 16 and glide sheet 20 by the bumper support part 24 and bracket 28 holds the bumper 14 against movement relative to the glide sheet 20 and holds the glide sheet 20 against movement relative to the board 16. By loosening the bolts 30 for each of the bumpers 14, it is possible to slide the bumpers along the length of the glide surface 20 to vary the distance between the bumpers and thereby vary the length of the glide stroke of a person exercising with the apparatus 10.

When the exercise apparatus 10 is to be used, a speed skater puts on socks over suitable exercise shoes. The socks provide the shoes with a surface having a low coefficient of friction to enable the feet of the skater to slide over the upper surface of the glide sheet 20. Of course, the shoes could have soles which would slide easily over the sheet 20.

Figure 1:
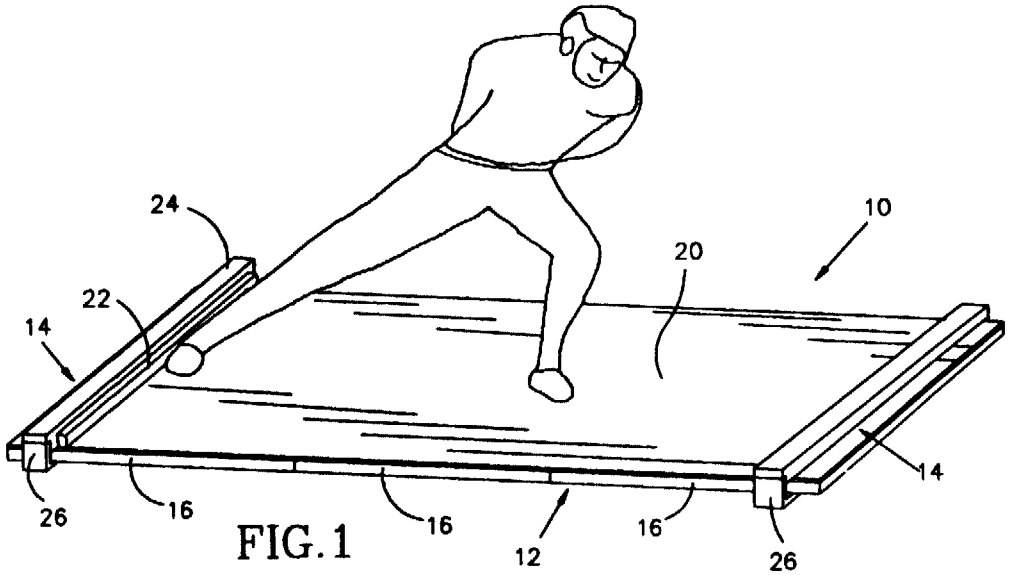
FIG. 1 is a pictorial illustration depicting the use of the exercising apparatus of the present invention.

The skater then gets on the glide sheet 20, in the manner illustrated schematically in FIG. 1. The skater pushes against one bumper 14 with the lower side of one foot, for example, the right foot as shown in FIG. 1, and slides along the plastic sheet 20 toward the opposite bumper 14. The other foot, that is, the left foot, slides into abutting engagement with the opposite bumper 14 to limit sideward movement of the skater. The skater then pushes off the second bumper with his left foot and slides back toward the first pumper. When the right foot of the skater engages the first bumper, he again pushes off to repeat the sliding movement across the upper surface of the plastic sheet 20. Sliding movement of the skater between bumpers 14 is repeated until the exercises are completed.

Each time a foot of the skater pushes off against one of the bumpers 14, the leg muscles are exercised in a manner which is generally the same as when the skater pushes the edge of a blade of a skate against the ice with a power stroke. Through consistent practice with the exercise apparatus 10, the legs of the skater are strengthened in the same manner as which they would be strengthened if he was actually skating on the ice. As the leg strength of the skater increases, the length of the exercise strokes are increased by increasing the distance between the bumpers 14.

When the skater has finished using the apparatus 10, the bolts 30 and nuts 32 holding the bumpers 14 are loosened and the plastic sheet 20 is removed from between the bumpers 14 and the base 12. The sheet 20 is then rolled. The base 12 is then folded at the hinges 18. The rolled sheet 20 and folded base 12 can be easily stored or transported. Although the plastic sheet 20 is too thick and rigid to be folded, it is sufficiently flexible to enable the sheet to be compactly rolled.

The sheet 20 is rigid enough to transmit forces applied by the gliding movement of the sock covered feet of a skater to the bumpers 14. Thus, if the skater is pushing off with a right foot and gliding with a left foot, as shown in FIG. 1, friction forces applied against the sheet 20 will be transmitted by the sheet to the bumper on the skater's left (FIG. 1) without forming wrinkles in the sheet.

It should be understood that although the base 12 has been illustrated in FIG. 2 as being formed by three boards 16 which are interconnected by hinges 18, a different number of boards could be used if desired and the boards could be interconnected in a different manner. However, it is believed that it will be preferred to interconnect the boards 16 in such a manner that the base 12 can be compactly collapsed by either completely disconnecting the boards 16 or by maintaining the boards interconnected with the use of suitable hinges, similar to the hinges 18. It should also be understood that the exercise apparatus 10 may be used by persons who participate in sports other than skating, for example, skiing.

Figure 3:
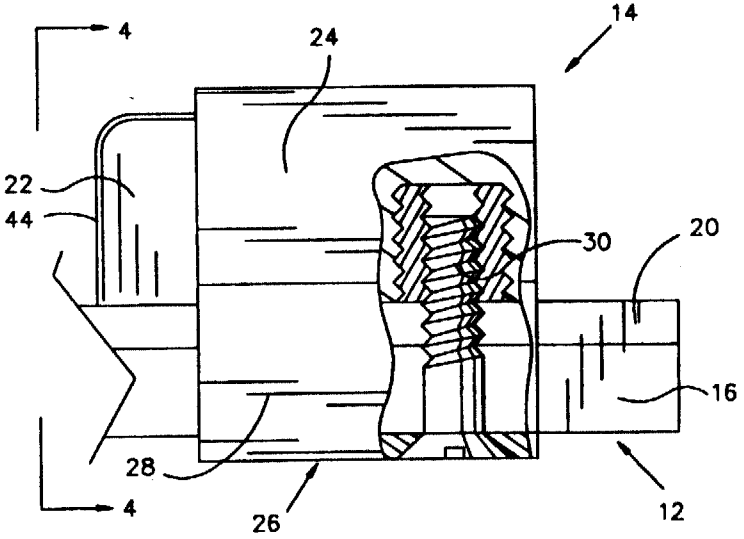
FIG. 3 is an enlarged fragmentary view illustrating how a bumper, base and glide sheet of the exercising apparatus of FIG. 1 are interconnected.

In FIGS. 1-3, the bumpers 14 are shown as extending perpendicular to the longitudinal central axis of the base 12. However, when a foot of a skater using the exercise apparatus 10 pushes off against a bumper 14 in the manner previously explained, the side of the foot naturally tends to be turned slightly outwardly at an angle of approximately 10° to a path along which a skater would be travelling if he was on ice. To accommodate this natural tendency of feet of the skater to turn outwardly as they push off, the bumpers 14 may be positioned so as to flare outwardly relative to each other.

Figure 5:
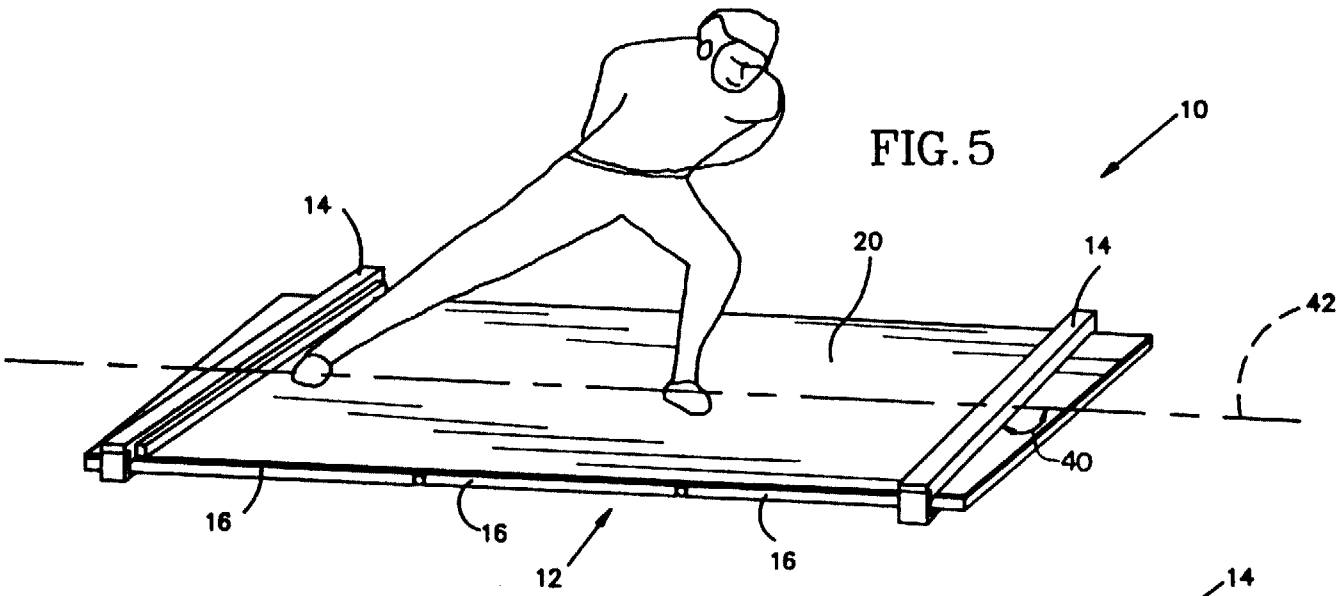
FIG. 5 is a pictorial illustration, generally similar to FIG. 1, illustrating how the bumpers may be angled relative to each other to correspond to the orientation of the feet of a person using the exercising apparatus.

In FIG. 5, the exercise apparatus 10 has been illustrated with the bumpers 14 extending at an acute angle 40 of approximately 80° relative to a longitudinal central axis 42 of the base 12. This results in a side surface 44 (FIG. 3) of each of the bumpers 14 being positioned at the same angle relative to the base 12 as the foot of a skater when the foot engages the side surface 44 of the cushion part 22 of a bumper 14. The angle at which the bumpers 14 are disposed relative to the base 12 can be adjusted, by releasing the clamp assemblies 26, to accommodate different foot orientations for different skaters.

Figure 6:
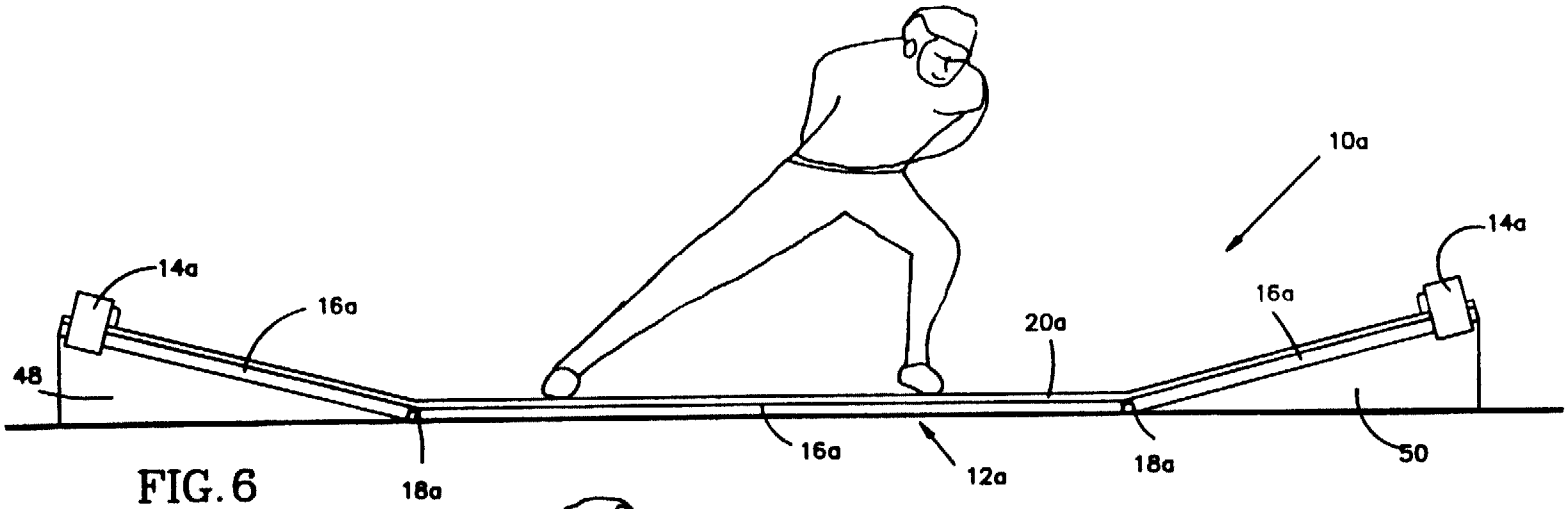
FIG. 6 is an elevational view of a second embodiment of the invention in which the base has end sections which slope upwardly from a central section of the base.

In the embodiment of the invention illustrated in FIGS. 1-5, the base 12 and glide sheet 20 are horizontal when the exercise apparatus is used. However, it is contemplated that the leg muscles of a skater or other athlete may be further strengthened by having the glide sheet extend upwardly to the bumpers. An embodiment of the invention having this construction is illustrated in FIG. 6. Since the embodiment of the invention illustrated in FIG. 6 is generally similar to the embodiment of the invention illustrated in FIGS. 1-5, similar numerals will be utilized to designate similar components, the suffix letter "a" be associated with the numerals of FIG. 6 to avoid confusion.

An exercising apparatus 10a includes a base 12a and a pair of bumpers 14a attached to opposite end portions of the base. The base 12a includes a plurality of boards 16a which are attached to each other by hinges 18a. The upper side of the rectangular base 12a is covered by a flexible glide sheet 20a.

In accordance with a feature of this embodiment of the invention, the boards 16a to which the bumpers 14a are connected, extend upwardly from a horizontal central section of the base. Therefore, befor the foot of a skater engages the bumper 14a, the foot must slide upwardly to the bumper. Although the bumpers 14a (FIG. 6) extend perpendicular to the longitudinal central axis of the base 12a, it is contemplated that the bumpers could be skewed relative to the longitudinal central axis of the base 12a, in the same manner shown in FIG. 5, to accommodate the angled orientation of a foot of a skater.

The boards 16a at opposite ends of the base 12a are supported by wedges or spacer blocks 48 and 50 so that the glide sheet 20a slopes upwardly from a horizontal central section to the bumpers 14a. The wedges 48 and 50 may be formed of any desired material capable of supporting the weight of a skater. However, it is preferred to form the wedges 48 and 50 from a rigid foam or plastic.

The wedges 48 and 50 are secured to boards 16a of the base 12a by screws and/or adhesive. The clamp assemblies for the bumpers 14a can be moved relative to the base 12a to adjust the exercise stroke of a skater and/or to adjust the angle which the bumpers make with the longitudinal central axis of the base 12a. Although the wedges 48 and 50 have been shown in FIG. 6 as being disposed beneath the boards 16a, the wedges could be disposed between the glide sheet 20a and the boards 16a if desired.

When the skater has finished using the apparatus 10, the clamp assemblies holding the bumpers 14a are loosened and the glide sheet 20a is removed from between the bumpers and the base 12a. The base 12a can then be folded at the hinges 18a. The wedges 48 and 50 can be left connected to the boards 16a or can be disconnected from the boards.

Figure 7:
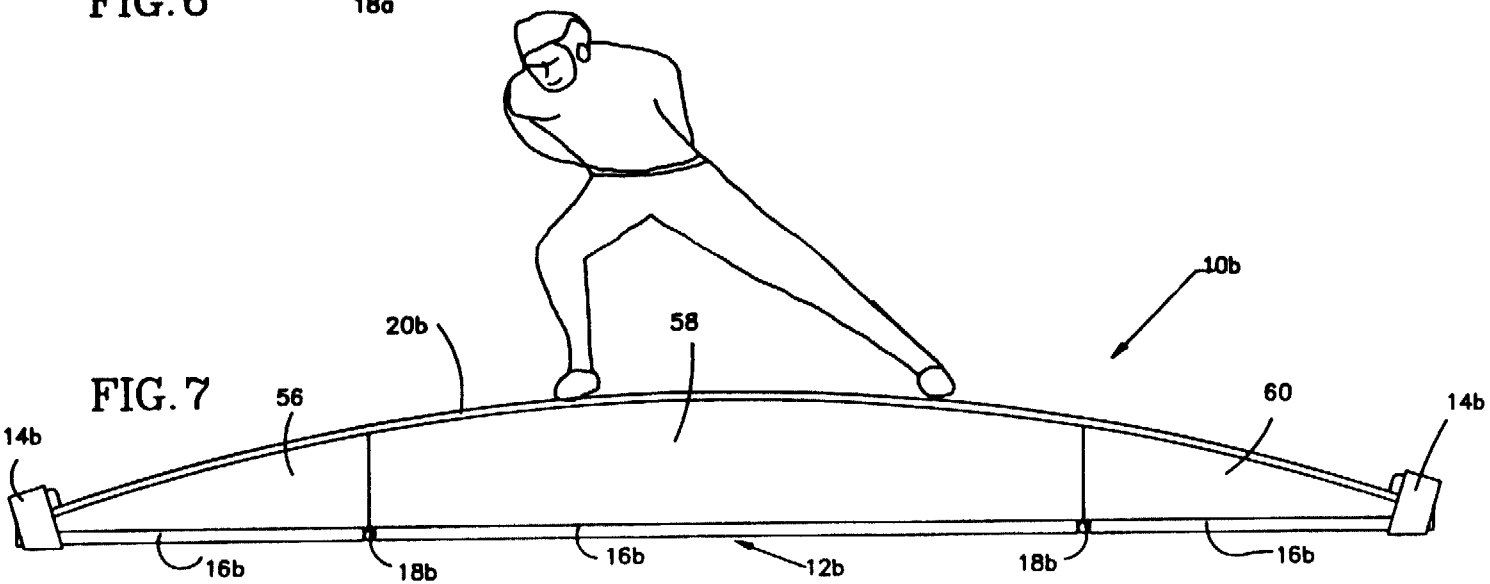
FIG. 7 is an elevational view, generally similar to FIG. 6, of an embodiment of the invention in which the glide sheet slopes downwardly in opposite directions from a raised central section.

In the embodiment of the invention illustrated in FIG. 6, the base 12a supports the glide sheet 20a so that the glide sheet has a generally concave configuration. It is contemplated that it may be desired to provide the glide sheet with a different configuration. In the embodiment of the invention illustrated in FIG. 7, the glide sheet has a convex configuration. Since the embodiment of the invention illustrated in FIG. 7 is generally similar to the embodiment of the invention illustrated in FIG. 6, similar numerals will be utilized to designate similar components, the suffix letter "b" being associated with the embodiment of the invention illustrated in FIG. 7 to avoid confusion.

The exercise apparatus 10b comprises a base 12b l and two bumpers 14b attached to opposite end portions of the base. The base 12b includes a plurality of boards 16b which are connected to each other by hinges 18h. A flexible glide sheet 20b is disposed above the base 12b.

In accordance with a feature of this embodiment of the invention, the glide sheet 20b has a convex configuration so that a skater must pull his foot upwardly toward the raised central section of the glide sheet 20b after the foot engages a bumper 14b. To provide the glide sheet 20b with a convex configuration, a plurality of spacer blocks 56, 58 and 60 are provided between the boards 16b of the base 12b and the glide sheet 20b. The spacer blocks 56, 58 and 60 have flat bottom side surfaces. The bottom side surfaces of the spacer blocks 56, 58 and 60 are disposed in abutting engagement with and have the same size as upper side surfaces of the boards 16b of the base 12b. The spacer blocks 56, 58 and 60 have arcuate upper side surfaces which form a continuously curving support surface for the glide sheet 20b.

The spacer blocks 56, 58 and 60 can be formed of any desired material having sufficient strength to support a skater. However, it is preferred to form the spacer blocks 56, 58 and 60 of a rigid foam or plastic material. In the embodiment of the invention illustrated in FIG. 7, the spacer blocks are provided between the base 12b and glide sheet 20b. However, if desired, the spacer blocks could be disposed beneath the base 12b.

The spacer blocks 56, 58 and 60 are held against movement relative to the base 12b by the clamps which connect the bumpers 14b with the base 12b. Thus, the edge portions of the spacer blocks 56 and 60 are compressed between the bumpers 14b and the base 12b to securely connect the bumpers 14b with the base 12b and to hold the support blocks 56 and 60 against sidewise movement under the influence of forces applied against the glide sheet 20b by the skater.

When the skater has finished using the exercise apparatus 10b, the clamp assemblies for the bumpers 14b are loosened and the plastic glide sheet 20b is removed from between the bumpers 14b and the spacer blocks 56 and 60. The base 12b is then folded at the hinges 18b. The spacer blocks 56, 58 and 60 are connected with the boards 16b and can be folded with the boards. However, if desired, the spacer blocks 56, 58 and 60 could be disconnected from the boards.

It is clear from the foregoing description that the present invention provides a simple universal exercising apparatus 10 for skaters or other athletes which is simple, lightweight, easy to transport and store and, also, permits the skater not to remain on the same spot. The apparatus 10 can be very quickly assembled and disassembled and occupies little space. To assemble the apparatus 10, it is sufficient to unfold a stack of hinged boards 16, unroll the gliding sheet 20 and fix the bumpers, gliding sheet and board platform together. A skater or skier then can put socks on his or her legs and exercise.

While the invention has been described herein in terms of the preferred embodiment, numerous variations may be made in the apparatus illustrated in the drawings and herein described without departing from the spirit and scope of the invention set forth in the appended claims.

I claim:

1. An exercising appartus for use in training for skating or other sports, said apparatus comprising:

a base which has a longitudinal extent and includes a plurality of board members arranged in side-by-side relationship and connector means for connecting adjacent board members to each other;

a flexible sheet having a smooth glide surface along which the feet of a person can slide, said sheet having an area which is substantially equal to the area of an upper side surface of said base and covering said upper side surface of said base;

first bumper means located near one end of the longitudinal extent of said base and extending transverse to the longitudinal extent of said base for engaging a side of the foot of a person sliding in a first direction on the glide surface along the longitudinal extent of said base;

second bumper means located near the other end of the longitudinal extent of said base and extending transverse to the longitudinal extent of said base for engaging a side of the foot of a person sliding in a second direction in the glide surface along the longitudinal extent of said base;

first clamp means for releasably connecting said first bumper means with said base; and second clamp means for releasably connecting said second bumper means with said base.

2. An exercising apparatus for use in training for skating or other sports, said apparatus comprising:

a base which has a longitudinal extent and includes a plurality of board members arranged in side-by-side relationship and connector means for connecting adjacent board members to each other;

a flexible sheet having a smooth glide surface along which the feet of a person can slide, said sheet having an area which is substntially equal to the area of an upper side surface of said base and covering said upper side surface of said base;

first bumper means located near one end of the longitudinal extent of said base for engaging a side of the foot of a person sliding in a first direction on the glide surface;

second bumper means located near the other end of the longitudinal extent of said base for engaging a side of the foot of a person sliding in a second direction on the glide surface;

first clamp means for releasably connecting said first bumper means with said base and said flexible sheet;

second clamp means for releasably connecting said second bumper means with said base and said flexible sheet;

said base having a longitudinal central axis which extends in the first and second directions, said first bumper means including first side surface means engageable by the foot of the person sliding in the first direction, said first side surface means extending at an acute angle to the longitudinal central axis of said base, said second bumper means including second side surface means engageable by the foot of the person sliding in the second direction, said second side surface means extending at an acute angle to the longitudinal central axis of said base, said first and second side surface means being skewed at an acute angle relative to each other.

3. An apparatus as set forth in claim 2 wherein said board members are made of wood and said flexible sheet is made of plastic material.

4. An apparatus as set forth in claim 2 wherein each of said bumper means includes bumper parts, and each of said clamp means includes a plurality of thread and members for releasably connecting said bumper parts with said board members.

5. An exercising apparatus for use in training for skating or other sports, said apparatus comprising:

a base which has a longitudinal extent and includes a plurality of board members arranged in side-by-side relationship and connector means for connecting adjacent board members to each other;

a flexible sheet having a smooth glide surface along which the feet of a person can slide, said sheet having an area which is substantially equal to the area of an upper side surface of said base and covering said upper side surface of said base;

first bumper means located near one end of the longitudinal extent of said base for engaging a side of the foot of a person sliding in a first direction on the glide surface;

second bumper means located near the other end of the longitudinal extent of said base for engaging a side of the foot of a person sliding in a second direction on the glide surface;

first clamp means for releasably connecting said first bumper means with said base and said flexible sheet;

second clamp means for releasably connecting said second bumper means with said base and said flexible sheet;

said base including a central section and first and second end sections which slope upwardly from said central section, said first bumper means being connected with said first end section of said base and said second bumper means being connected with said second end section of said base.

6. An exercising apparatus for use in training for skating or other sports, said appartus comprising:

a base which has a longitudinal extent and includes a plurality of board members arranged in side-by-side relationship and connector means for connecting adjacent board members to each other;

a flexible sheet having a smooth glide surface along which the feet of a person can slide, said sheet having an area which is substantially equal to the area of an upper side surface of said base and covering said upper side surface of said base;

first bumper means located near one end of the longitudinal extent of said base for engaging a side of the foot of a person sliding in a first direction on the glide surface;

second bumper means located near the other end of the longitudinal extent of said base for engaging a side of the foot of a person sliding in a second direction on the glide surface;

first clamp means for releasably connecting said first bumper means with said base and said flexible sheet;

second clamp means for releasably connecting said second bumper means with said base and said flexible sheet;

said base including a central section and first and second end sections which slope downwardly from said central section, said first bumper means being connected with said first end section of said base and said second bumper means being connected with said second end section of said base.

7. An exercising apparatus kit for use in training for skating and other sports, said kit comprising the following component parts capable of being assembled together:

a plurality of board members adapted to be assembled in side-by-side relationship to form a base of the exercising apparatus having a predetermined longitudinal extent;

connector means for connecting adjacent board members to each other;

a flexible sheet having a smooth glide surface along which the feet of a person can slide, said sheet having an area which is substantially equal to the area of an upper side surface of said base for covering said upper side surface of said base;

first bumper means for locating near one end of the longitudinal extent of said base transverse to the longitudinal extent of said base for engaging a side of the foot of a person sliding in a first direction on the glide surface along the longitudinal extent of said base;

second bumper means for location near the other end of the longitudinal extent of said base transverse to the longitudinal extent of said base for engaging a side of the foot of a person sliding in a second direction of the glide surface along the longitudinal extent of said base; and a plurality of clamp means for releasably connecting said first and second bumper means with said base.

8. A kit as set forth in claim 7 further comprising at least two wedge blocks for positioning in overlying relationship with board members forming opposite end portions of said base to form upwardly sloping end portions of said base.

9. A kit as set forth in claim 7 further comprising a plurality of spacer block members, each spacer block member having a flat base and an arcute upper surface, said spacer block members when assembled forming a continuously curved upper surface.

*10. An exercising apparatus for use in training for skating or other sports, said apparatus comprising:*

*sliding surface means, said sliding surface means comprises longitudinally extending flexible surface means along which the feet of a person can slide, said flexible surface means being capable of being rolled for storage purposes;*

*first bumper means located near one end of the longitudinal extent of said flexible surface means and extending transverse to the longitudinal extent of said flexible surface means for engaging a side of the foot of a person sliding in a first direction along the longitudinal extent of said flexible surface means;*

*means for connecting said first bumper means with said flexible surface means;*

*second bumper means located near the other end of the longitudinal extent of said flexible surface means and extending transverse to the longitudinal extent of said flexible surface means for engaging a side of the foot of a person sliding in a second direction along the longitudinal extent of said flexible surface means; and*

*means for connecting said second bumper means with said flexible surface means;*

*said first bumper means being movable relative to said flexible surface means between a first position in which a longitudinal central axis of said first bumper means extends perpendicular to a longitudinal central axis of said flexible surface means and any one of a plurality of positions in which the longitudinal central axis of said first bumper means is skewed at any one of a plurality of acute angles to the longitudinal central axis of said flexible surface means to accommodate any one of a plurality of different foot orientations of a person using said apparatus.*

*11. An exercising apparatus as set forth in claim 10, said means for connecting said first bumper means with said flexible surface means including first clamp means, said means for connecting said second bumper means with said flexible surface means including second clamp means, said first clamp means being releasable to enable the position of said first bumper means relative to said flexible surface means to be varied and to enable said first bumper means to be disconnected from said flexible surface means for storage purposes.*

*12. An exercising apparatus as set forth in claim 10, said means for connecting said first bumper means with said flexible surface means including a first clamp means, said means for connecting said second bumper means with said flexible surface means including a second clamp means, said first and second clamp means being releasable to enable the positions of said first and second bumper means relative to said flexible surface means to be varied and to enable said first and second bumper means to be disconnected from said flexible surface means.*

*13. An exercising apparatus for use in training for skating or other sports, said apparatus comprising:*

*sliding surface means, said sliding surface means comprising longitudinally extending flexible surface means along which the feet of a person can slide, said flexible surface means being capable of being rolled for storage purposes;*

*first bumper means located near one end of the longitudinal extent of said flexible surface means and extending transverse to the longitudinal extent of said flexible surface means for engaging a side of the foot of a person sliding in a first direction along the longitudinal extent of said flexible surface means;*

*a first base element having an upper side surface engagable with a lower side surface of said flexible surface means;*

*means for clamping a portion of said flexible surface means between said first base element and said first bumper means;*

*second bumper means located near the other end of the longitudinal extent of said flexible surface means and extending transverse to the longitudinal extent of said flexible surface means for engaging a side of the foot of a person sliding in a second direction along the longitudinal extent of said flexible surface means;*

*a second base element having an upper side surface engagable with the lower side surface of said flexible surface means; and*

*means for clamping a portion of said flexible surface means between said second base element and said second bumper means.*

* * * * *